(12) United States Patent
Li

(10) Patent No.: US 6,791,276 B2
(45) Date of Patent: Sep. 14, 2004

(54) GRADUALLY LIGHTING/DIMMING WIRELESS TRANSMISSION INDICATOR LAMP

(75) Inventor: Jian-Huei Li, Hsin-Chu (TW)

(73) Assignee: Zyxel Communications Corporation, Hsin-Chu (TW)

(*) Notice: Subject to any disclaimer, the term of this patent is extended or adjusted under 35 U.S.C. 154(b) by 185 days.

(21) Appl. No.: 10/251,884

(22) Filed: Sep. 23, 2002

(65) Prior Publication Data

US 2004/0057235 A1 Mar. 25, 2004

(51) Int. Cl.[7] .................................................. H01J 1/60
(52) U.S. Cl. ...................... 315/129; 315/136; 315/291; 340/488; 340/469; 340/512
(58) Field of Search ......................... 315/291, 307, 315/DIG. 4, 129, 130, 136; 340/469, 488, 512, 5.64; 455/123, 3.01, 403, 157.2

(56) References Cited

U.S. PATENT DOCUMENTS

| | | | | |
|---|---|---|---|---|
| 4,975,629 A | * | 12/1990 | Callahan et al. | 323/235 |
| 5,017,837 A | * | 5/1991 | Hanna et al. | 315/136 |
| 5,099,193 A | * | 3/1992 | Moseley et al. | 323/324 |
| 5,479,408 A | * | 12/1995 | Will | 370/313 |

* cited by examiner

Primary Examiner—Haissa Philogene
(74) Attorney, Agent, or Firm—Rosenberg, Klein & Lee

(57) ABSTRACT

Gradually lighting/dimming wireless transmission indicator lamp used in a wireless data transmission apparatus. The wireless transmission indicator lamp includes at least one light emitting diode, a wireless transceiver circuit for receiving or transmitting radio signal and converting the received radio signal into digital pulse signal and a controlling circuit having an input terminal and at least one output terminal. The input terminal is connected with the wireless transceiver circuit. The output terminal is connected with the light emitting diode. The controlling circuit is controllable by the digital pulse signal to generate a slowly varying current for the light emitting diode, whereby the light emitting diode can gradually light and dim as human breath to indicate the connection state and transmission state of the wireless data transmission apparatus.

8 Claims, 4 Drawing Sheets

GRADUALLY LIGHTING/DIMMING WIRELESS TRANSMISSION INDICATOR LAMP

BACKGROUND OF THE INVENTION

The present invention is related to a gradually lighting/dimming wireless transmission indicator lamp, and more particularly to a transmission indicator lamp mounted on a wireless data transmission apparatus such as a wireless network card, wireless line concentrator, etc. The wireless transmission indicator lamp can gradually light and dim as human breath to indicate the transmission state of the wireless data transmission apparatus.

It is known that one or several indicator lamps are often arranged on a conventional data transmission interface such as a line concentrator and a network card for indicating whether the data transmission interface is transmitting data. In some cases, there are a receiving indicator lamp and a transmission indicator lamp arranged on the data transmission interface. In some other cases, only one transmission indicator lamp is used to indicate the transmission state of the data transmission interface. However, such transmission indicator lamp fails to actually show the time sequence state of the transmission. This is because that generally, the transmission time sequence frequency exceeds 500 KHz or even 100 MHz. Therefore, the common transmission indicator lamp can only quickly visibly flicker to show the transmission state. Such indication of quick flickering is only distinguishable from the power light and substantially meaningless.

Currently, many data apparatuses transmit information by way of wireless measure, such as wireless network card and wireless line concentrator. The transmission indicator lamp plays a very important role in these wireless data transmission apparatuses. This is because that the transmission indicator lamp can indicate whether the wireless transmission apparatus is connected with another wireless apparatus. It is tried by the applicant to develop a gradually lighting/dimming wireless transmission indicator lamp instead of the conventional flickering transmission indicator lamp. The wireless transmission indicator lamp can gradually light and dim as human breath to indicate the transmission state of the wireless data transmission apparatus and enhance the appearance thereof.

SUMMARY OF THE INVENTION

It is therefore a primary object of the present invention to provide a gradually lighting/dimming wireless transmission indicator lamp used in a wireless data transmission apparatus for indicating the connection state and transmission state thereof. The wireless transmission indicator lamp includes at least one light emitting diode, a wireless transceiver circuit for receiving or transmitting radio signal and converting the received radio signal into digital pulse signal and a controlling circuit having an input terminal and at least one output terminal. The input terminal of the controlling circuit is connected with said wireless transceiver circuit. The output terminal of the controlling circuit is connected with the light emitting diode. The controlling circuit is controllable by the digital pulse signal to generate a slowly varying current for said light emitting diode, whereby said light emitting diode can gradually light and dim as human breath to indicate the connection state and transmission state of the wireless data transmission apparatus.

It is a further object of the present invention to provide the above gradually lighting/dimming wireless transmission indicator lamp in which said wireless transceiver circuit includes an antenna for receiving or transmitting radio signal and an analog-to-digital converting circuit connected to the antenna for converting the radio signal received by the antenna from analog signal into digital pulse signal.

It is still a further object of the present invention to provide the above gradually lighting/dimming wireless transmission indicator lamp in which controlling circuit includes: a pulse buffering circuit connected to the wireless transceiver circuit, the pulse buffering circuit being composed of at least one resistor and a capacitor which form a first RC charging/discharging network for controlling frequency change of the digital pulse signal; a current varying circuit connected to the light emitting diode, the current varying circuit being composed of at least one transistor and a second RC charging/discharging network for generating slowly varying current to control the change of brightness of the light emitting diode; and a comparator, an output terminal of the comparator being connected to the pulse controlling circuit, an output terminal of the comparator being connected to the current varying circuit. The pulse controlling circuit controls the frequency of the pulse in cooperation with negative feedback circuit of the current varying circuit so as to control the transistor to generate a slowly varying current.

BRIEF DESCRIPTION OF THE DRAWINGS

The present invention can be best understood through the following description and accompanying drawings wherein.

DETAILED DESCRIPTION OF THE PREFERRED EMBODIMENTS

Figure 1:
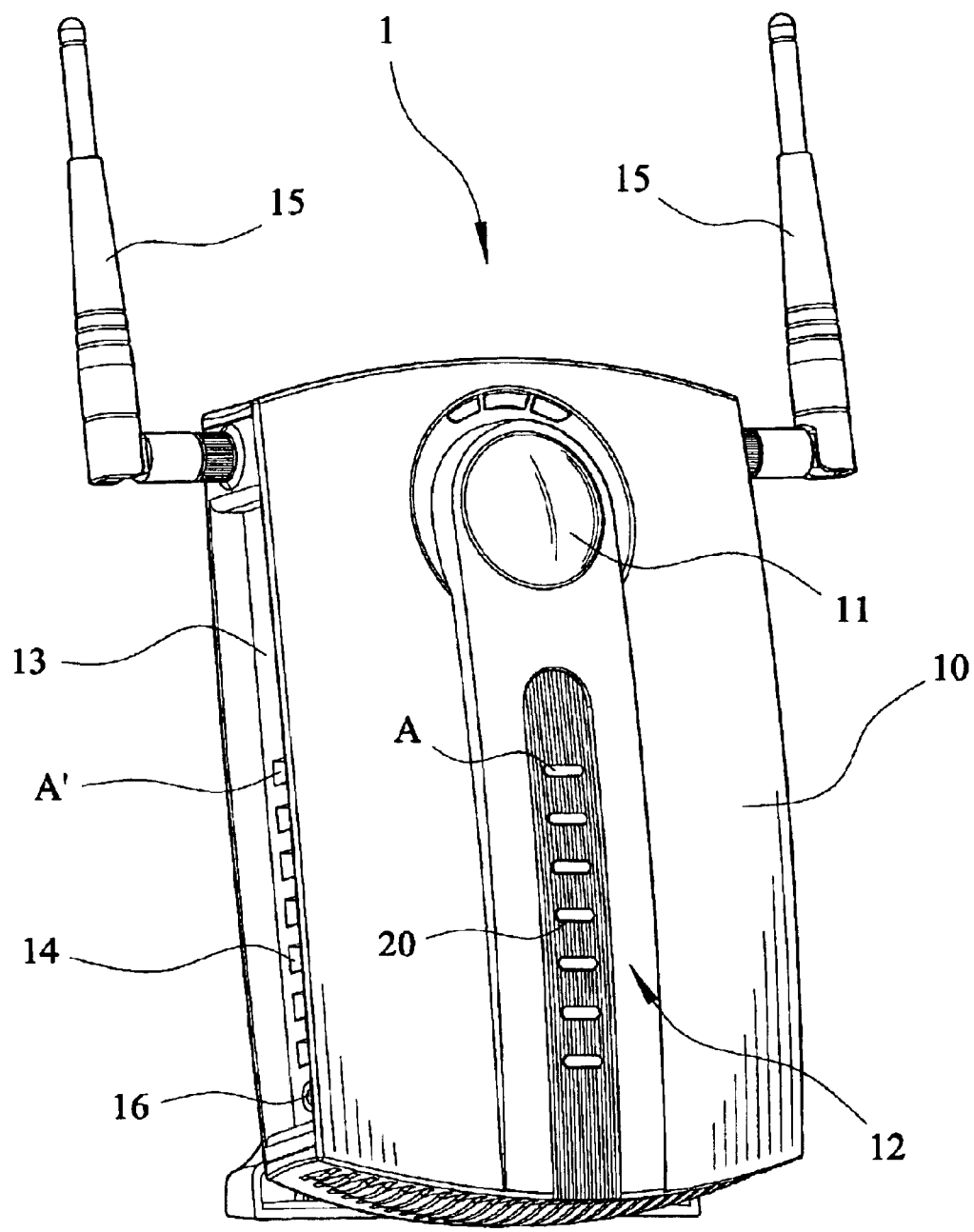
FIG. 1 is a perspective view of the present invention applied to a wireless line concentrator.

Please refer to FIG. 1 which shows that the present invention is applied to a wireless line concentrator. The gradually lighting/dimming wireless transmission indicator lamp of the present invention is mainly used in a wireless data transmission apparatus such as a wireless network card, wireless divisional network line concentrator, etc. The wireless line concentrator 1 is exemplified to illustrate the present invention. A power indicator lamp 11 and a connection state lighting section 12 are arranged on the front panel 10 of the housing of the wireless line concentrator 1. The lighting section 12 is composed of multiple light emitting diodes 20. Multiple network line connecting jacks 14 are arranged on a side board 13 of the housing of the wireless line concentrator 1 for connecting the wireless line concentrator 1 with a computer or a servo. The indicator lamp A of the lighting section 12 serves to indicate the connection state and transmission state of the connecting jack A' of the wireless line concentrator 1. When the connecting jack A' is connected, the indicator lamp A will light. In the case of data transmission, the indicator lamp A will flicker. An antenna 15 and a power input terminal 16 are disposed on the wireless line concentrator 1. The antenna 15 serves to receive or transmit radio signal. The power input terminal 16 serves to provide input working power for the wireless line concentrator 1. When powered on, the power indicator lamp 11 will light.

Figure 2:
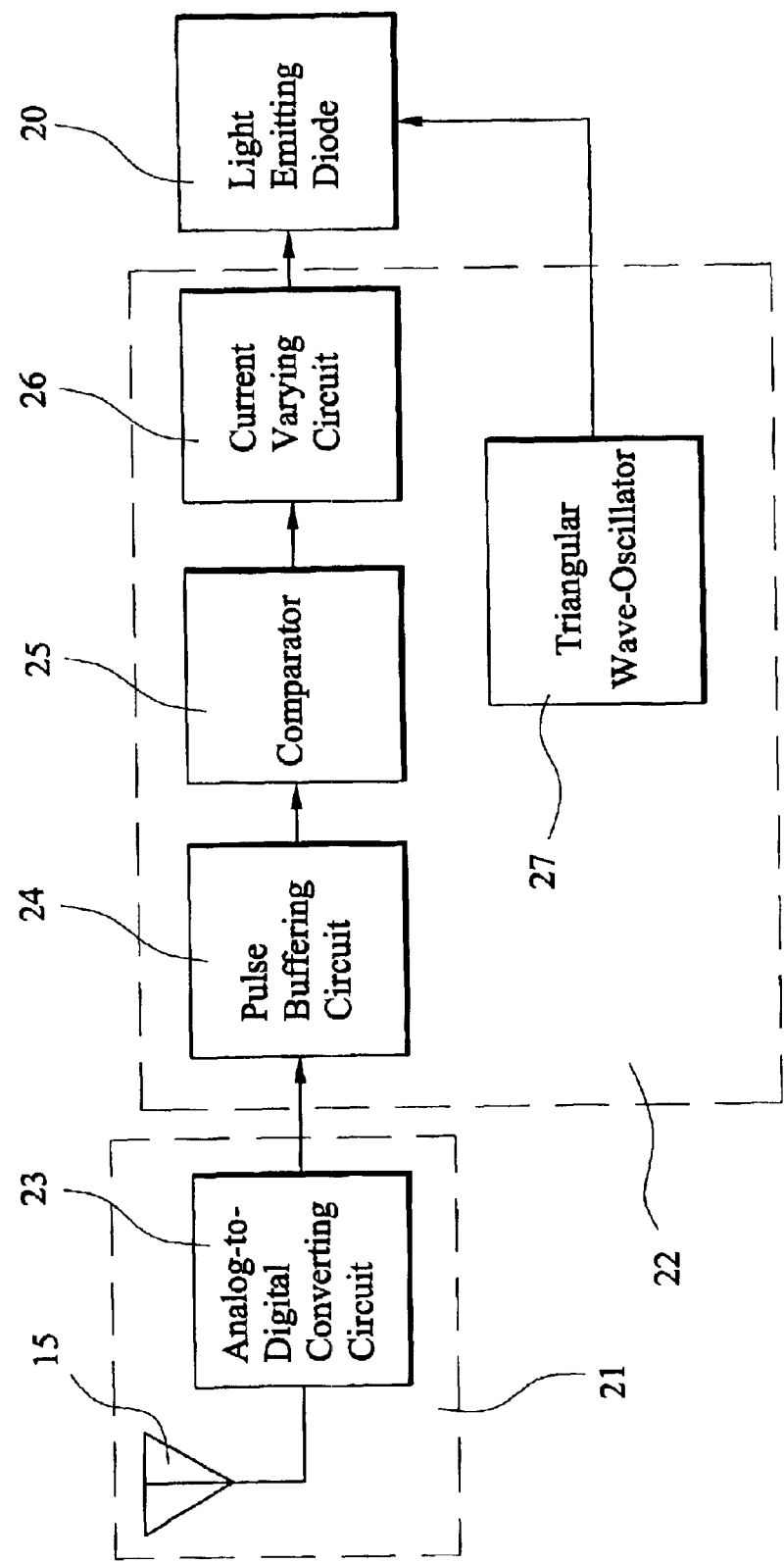
FIG. 2 is a block circuit diagram of a first embodiment of the present invention.

The power indicator lamp 11 or the indicator lamps in the connection state lighting section 12 will gradually light and dim as human breath. FIG. 2 is a block circuit diagram of a first embodiment of the present invention. The circuit of the present invention is mainly composed of at least one light emitting diode 20, a wireless transceiver circuit 21 and a controlling circuit 22. The wireless transceiver circuit 21 is composed of an antenna 15 and an analog-to-digital converting circuit 23. The antenna 15 is used to receive or transmit radio signal. The analog-to-digital converting circuit 23 is connected to the antenna 15 for converting the radio signal received by the antenna 15 from analog signal into digital pulse signal.

Figure 3:
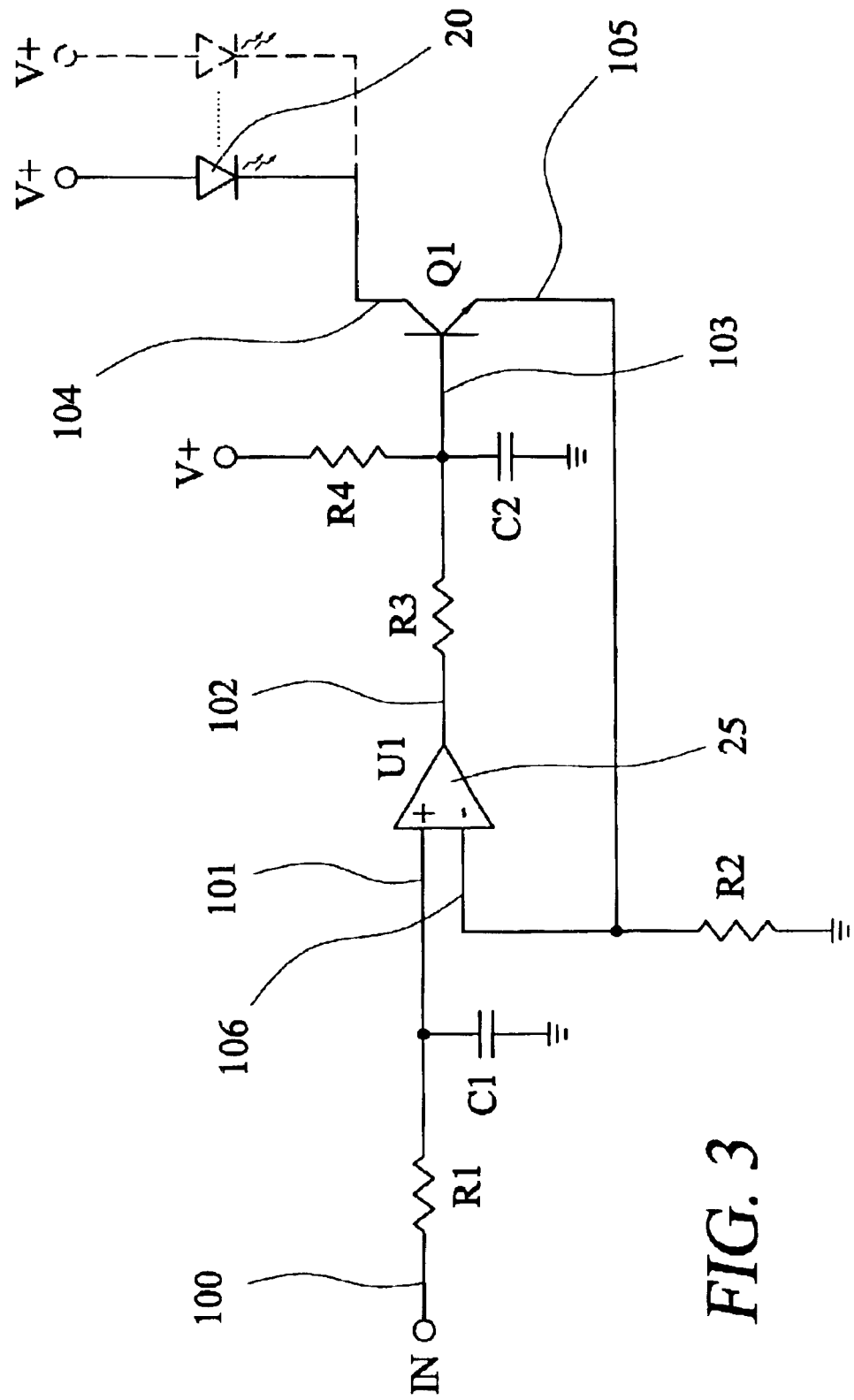
FIG. 3 is a circuit diagram of the controlling circuit of FIG. 2.

Also referring to FIG. 3 which is a circuit diagram of the controlling circuit of FIG. 2. The controlling circuit 22 is mainly composed of a pulse buffering circuit 24, a comparator 25 and a current varying circuit 26. In the pulse buffering circuit 24, a resistor R1 and a capacitor C1 form a first RC charging/discharging network. The input terminal of the resistor R1 is connected with the wireless transceiver circuit 21 for receiving the digital pulse signal 100 input by the analog-to-digital converting circuit 23. By means of the RC charging/discharging network, the frequency change of the digital pulse signal can be controlled and varied. That is, by means of changing RC value, the value of the pulse frequency can be changed.

After the pulse frequency is lowered by the pulse buffering circuit 24, the digital pulse signal is output to the + input terminal 101 of the comparator 25. The output terminal 102 of the comparator 25 is further connected to the current varying circuit 26. The current varying circuit 26 is composed of a capacitor C2, two resistors R3, R4 and a transistor Q1. The capacitor C2 and the resistors R3, R4 form a second RC charging/discharging network.

The output terminal 102 of the comparator 25 is connected to a terminal of the resistor R3 and then output to the base 103 of the transistor Q1 by means of charging/discharging the capacitor C2 so as to control the collector 104 of the transistor Q1 to generate a slowly varying current. Accordingly, the light emitting diode 20 connected to the collector 104 of the transistor Q1 slowly lights or dims. The emitter 105 of the transistor Q1 is further connected to—input terminal 106 of the comparator 25 to form a negative feedback circuit. Accordingly, the pulse controlling circuit can control the frequency of the pulse to make the light emitting diode gradually light and dim as human breath.

Figure 4:
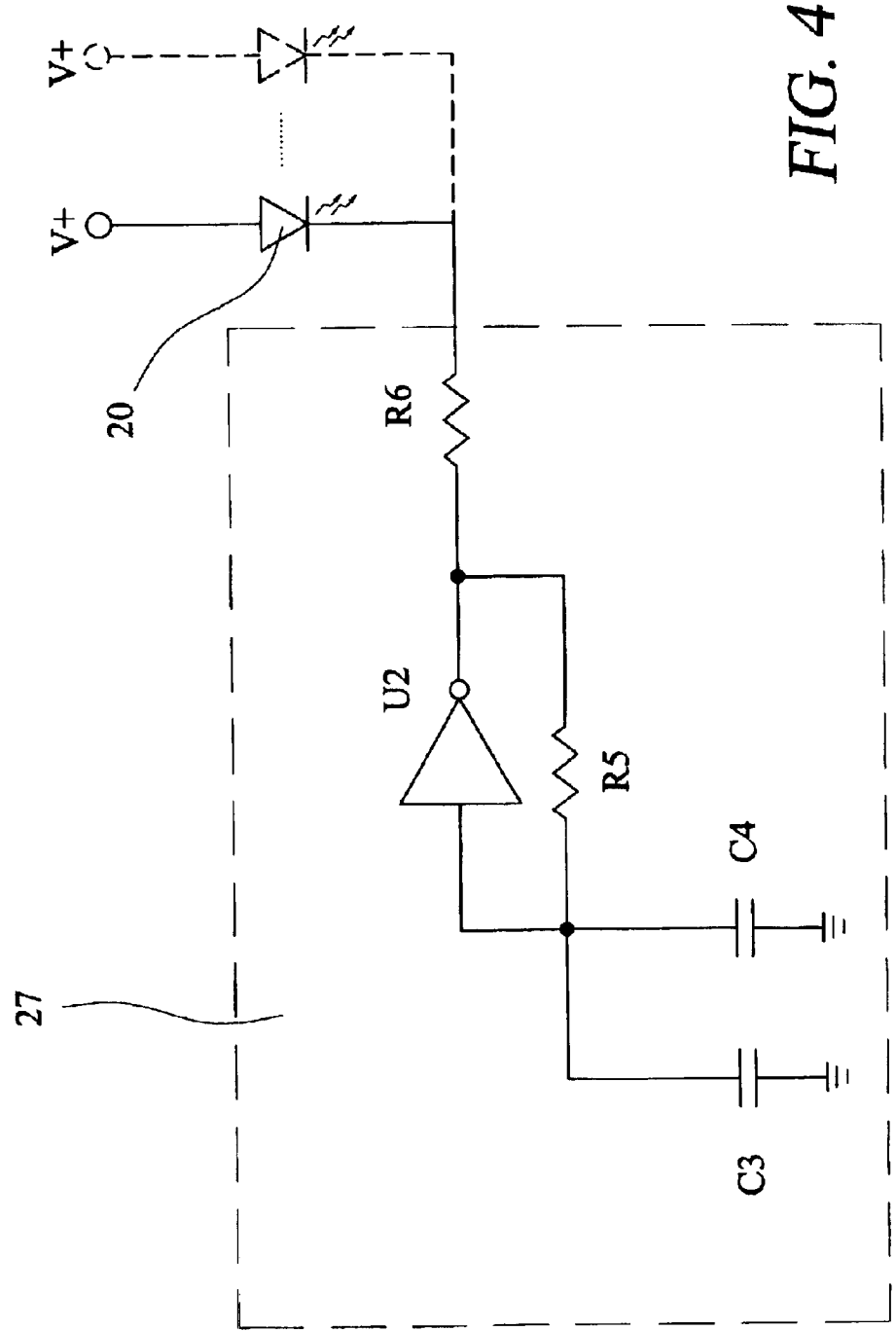
FIG. 4 is a circuit diagram of a second embodiment of the present invention.

The above embodiment is controlled by the transmission signal and thus is applicable to the connection state indicator lamp. The second embodiment of the present invention is applicable to the power indicator lamp. FIG. 4 is a circuit diagram of the second embodiment, in which a phase reverser U2, two capacitors C3, C4 and a resistor R5 form a triangular wave-oscillator 27 for outputting a triangular wave to the light emitting diode 20. Therefore, once the present invention is powered on, the light emitting diode 20 will gradually light and dim as human breath to indicate the states. A preferred frequency control period of this embodiment is about 6 seconds. In addition, the color of the light emitting diode used in the present invention can be red, yellow, green, orange or white or any combination of the above colors.

The wireless transmission indicator lamps of the present invention can gradually light and dim as human breath. Therefore, in transmission state, the appearance of the wireless transmission device is beautified.

The above embodiments are only used to illustrate the present invention, not intended to limit the scope thereof. Many modifications of the above embodiments can be made without departing from the spirit of the present invention.

What is claimed is:

1. A gradually lighting/dimming wireless transmission indicator lamp used in a wireless data transmission apparatus for indicating connection state and transmission state thereof, said wireless transmission indicator lamp comprising:

a wireless transceiver circuit for receiving or transmitting radio signal and converting the received radio signal into digital pulse signal;

at least one light emitting diode mounted on said wireless data transmission apparatus; and a controlling circuit having an input terminal and at least one output terminal, said input terminal being connected with said wireless transceiver circuit, said output terminal being connected with said light emitting diode, said controlling circuit being controllable by said digital pulse signal to generate a slowly varying current for said light emitting diode, whereby said light emitting diode gradually lights and dims to indicate the indicating connection state and transmission state.

2. The gradually lighting/dimming wireless transmission indicator lamp as claimed in claim 1, wherein said wireless transceiver circuit includes an antenna for receiving or transmitting radio signal and an analog-to-digital converting circuit connected to said antenna for converting the radio signal received by said antenna from analog signal into digital pulse signal.

3. The gradually lighting/dimming wireless transmission indicator lamp as claimed in claim 1, wherein said controlling circuit includes:

a pulse buffering circuit connected to said wireless transceiver circuit, said pulse buffering circuit being composed of at least one resistor and a capacitor which form a first RC charging/discharging network for controlling frequency change of the digital pulse signal;

a current varying circuit connected to said light emitting diode, said current varying circuit being composed of at least one transistor and a second RC charging/discharging network for generating slowly varying current to control the change of brightness of said light emitting diode; and a comparator, an output terminal of the comparator being connected to said pulse controlling circuit, an output terminal of the comparator being connected to said current varying circuit, whereby said pulse controlling circuit controls the frequency of the pulse in cooperation with negative feedback circuit of said current varying circuit so as to control the transistor to generate a slowly varying current.

4. The gradually lighting/dimming wireless transmission indicator lamp as claimed in claim 1, wherein the current varying period of said current varying circuit is about 6 second.

5. The gradually lighting/dimming wireless transmission indicator lamp as claimed in claim 1, wherein the color of said light emitting diode can be red, yellow, green, orange or white or any combination of the above colors.

6. A gradually lighting/dimming wireless transmission indicator lamp used in a wireless data transmission appara tus for indicating power state thereof, said wireless transmission indicator lamp comprising:

at least one light emitting diode; and a controlling circuit, an output terminal of the controlling circuit being connected with said light emitting diode for generating a slowly varying current for said light emitting diode, whereby said light emitting diode gradually lights and dims to indicate the indicating connection state and transmission state.

7. The gradually lighting/dimming wireless transmission indicator lamp as claimed in claim 6, wherein said controlling circuit includes a phase reverser, two capacitors and a resistor which form a triangular wave-oscillator for outputting a triangular wave to said light emitting diode, whereby said light emitting diode can gradually light and dim to indicate the state.

8. The gradually lighting/dimming wireless transmission indicator lamp as claimed in claim 7, wherein the period of said triangular wave generated by the triangular wave-oscillator is about 6 seconds.

* * * * *